Dec. 7, 1965 B. J. ASKOWITH 3,222,529

CIRCUIT WITH TWO PHOTOCELLS AND CHOPPING MEANS HAVING OPENINGS RELATED TO PHOTOCELL SPACING

Filed June 28, 1962

INVENTOR.
BURTON J. ASKOWITH

BY

Henry Hansen
AGENT 3,222,529
Patented Dec. 7, 1965

3,222,529

CIRCUIT WITH TWO PHOTOCELLS AND CHOPPING MEANS HAVING OPENINGS RELATED TO PHOTOCELL SPACING

Burton J. Askowith, Orlando, Fla., assignor, by mesne assignments, to the United States of America as represented by the Secretary of the Navy Filed June 28, 1962, Ser. No. 206,561
3 Claims. (Cl. 250—209)

The present invention relates to a photoconductive cell circuit and more particularly to a circuit wherein the effective sensitivity of photoconductive cells as used in conjunction with normally-occluded pulses of chopped radiation is increased.

Conventional photoconductive cell circuits used for converting modulated light into an A.C. signal whether the circuit is used as a simple light intensity indicator or as a D.C. to A.C. converter have generated therein noise components which appear in the output A.C. signal. Such noise components normally increase in amplitude with the same order of magnitude as the R.M.S. value of the output A.C. signal. In other words, when it is desired to double the amplitude of the output A.C. signal, the noise component signal amplitude is also doubled.

The present invention provides an arrangement whereby in response to a particularly modulated light beam the R.M.S. of the A.C. output signal of a photoconductive cell circuit is twice that which the prior art device is capable of providing while at the same time the noise is greater by only a factor of $\sqrt{2}$.

The present invention contemplates a photoconductive cell circuit comprising a pair of photoconductive cells connected in parallel in a field of modulated light. By causing the light to rise and fall in intensity on each cell alternately the responses from the two photoconductive cells add coherently to produce twice the normal signal while the component of noise from each photoconductive cell add non-coherently to produce an increase in noise of only a factor of $\sqrt{2}$.

Therefore, it is an object of the present invention to provide a photoconductive cell circuit for use in conjunction with a particularly modulated light source wherein the effective sensitivity of the photoconductive cells is increased while at the same time the signal to noise ratio increase is significantly reduced.

It is another object of the present invention to provide a photoconductive cell circuit of general utility wherein an A.C. output signal is produced having a frequency proportional to the rate of rise and fall of light source intensity and having an amplitude proportional to the intensity of the light source.

Still another object of the present invention is to provide a circuit for converting D.C. voltage into an A.C. voltage in response to a modulated light wherein the frequency of the A.C. voltage is a function of the modulation and the magnitude of the A.C. voltage is proportional to the intensity of the light.

Other objects and many of the attendant advantages of this invention will be readily appreciated as the same becomes better understood by reference to the following detailed description when considered in connection with the accompanying drawings in which like reference numerals designate similar parts throughout the figures thereof and wherein.

Figure 1:
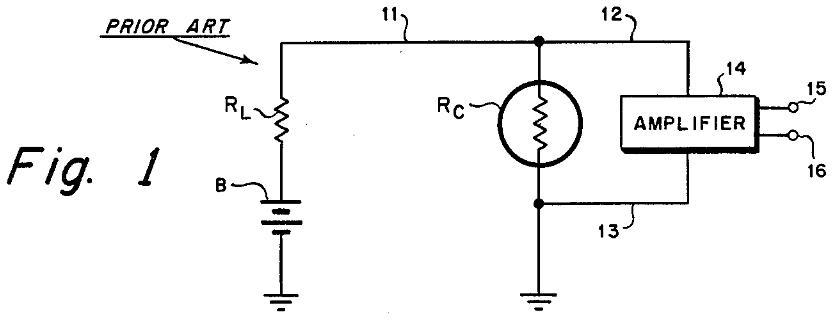
FIG. 1 shows a prior art circuit using one photoconductive cell.

Referring now to FIG. 1, there is shown a prior art circuit which is normally used with a modulated light source. The circuit of FIG. 1 comprises a battery B connected at its negative side to ground. A load resistor $R_L$ is connected at one side to the positive side of battery B. A photoconductive cell $R_c$ is connected via conductor 11 to a load resistor $R_L$ as shown. The other side of photoconductive cell $R_c$ is connected to ground. Photoconductor cell $R_c$ is a cell of the type having a resistance which changes in value according to the intensity of the light incident thereon. Terminals 12 and 13 connect the input of amplifier 14 across photoconductive cell $R_c$. Terminals 15 and 16 may be used to connect the outputs of the amplifier 14 to any particular utilization circuit as, for example, an A.C. meter when it is desired simply to measure and indicate the intensity of the modulated light beam.

The circuit of FIG. 1 is intended for use in a modulated light field. Such a field may be produced by a simple light chopping arrangement. As the moving beams of light from a chopper and light source pass photoconductive cell $R_c$, an A.C. voltage signal is produced between terminals 12 and 13 which has a frequency proportional to the rate at which the light passes or rises and falls upon photoconductive cell $R_c$ and an R.M.S. value which is proportional to the intensity of the light. Aside from being a circuit for measuring the intensity of the light, the circuit of FIG. 1 may be utilized as a circuit for converting the D.C. voltage of battery B into A.C. voltage in a controlled manner and is, therefore, a D.C. to A.C. converter which has separate utility as, for example, in servo mechanism systems.

Figures 2, 3:
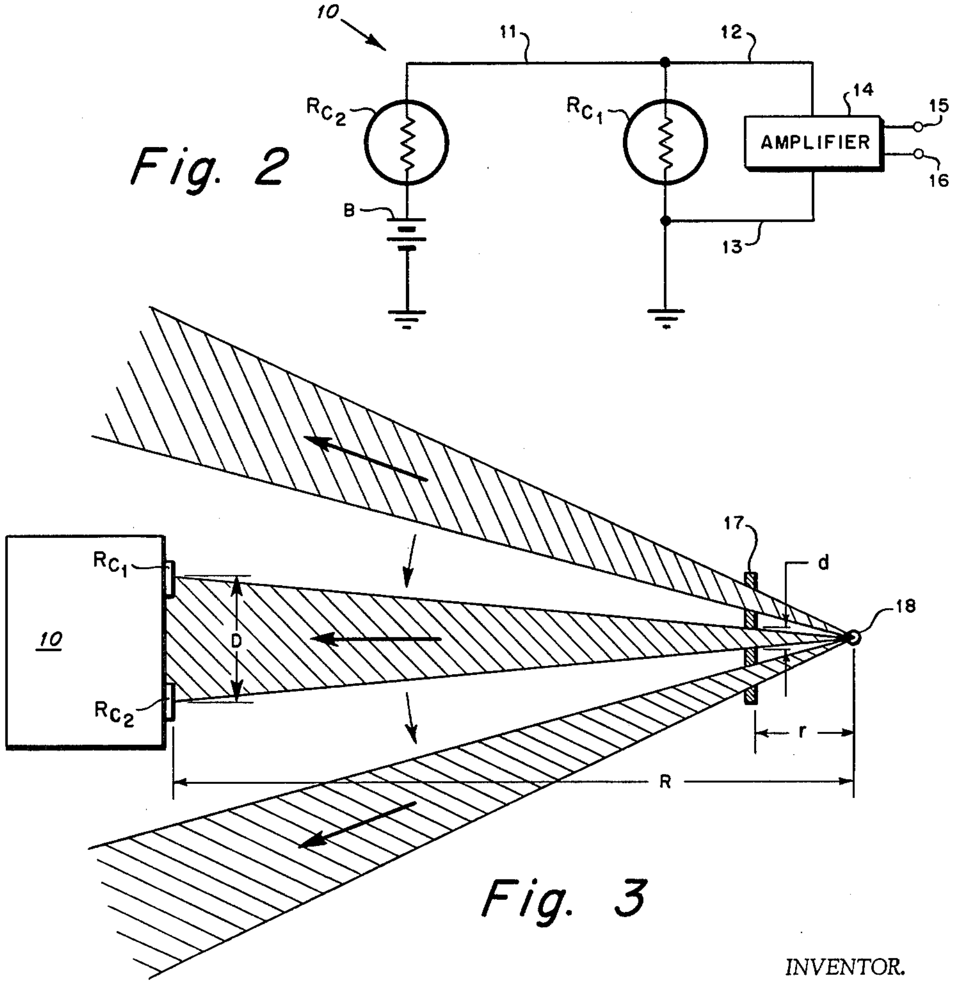
FIG. 2 illustrates in schematic form the circuit of the present invention.
FIG. 3 illustrates the physical relationship between the photoconductive cells of FIG. 2 and the light modulating arrangement of the invention.

Referring now to FIG. 2, there is shown a circuit 10 in which are shown two photoconductive cells of equal dark resistance $Rc_1$ and $Rc_2$ connected together by a conductor 11. One side of photoconductive cell $Rc_2$ is connected to the positive side of battery B, the negative side of which is connected to ground. The other side of photoconductive cell $Rc_1$ is connected to ground. One One photoconductive cell acts as a load resistor for the other. The only difference between FIG. 1 and FIG. 2 being that $R_L$ or the load resistor is replaced by photoconductive cell $Rc_2$. However, both cells $Rc_2$ and $Rc_1$ are exposed under particular physical conditions to modulated light, for example, to light from a small incandescent lamp which is being chopped by a rotating mechanical chopper as more fully described in connection with FIG. 3. In a fashion similar to FIG. 1, terminals 12 and 13 are connected acrosss photoconductive cell $Rc_1$ to provide amplifier 14 with an input of the A.C. voltage across cell $Rc_1$. Output terminals 15 and 16 of amplifier 14 may be connected to any desired utilization circuit.

When the load resistor $R_L$ of the photoconductive cell circuit of FIG. 1 is replaced as in FIG. 2 by a second photoconductive cell $Rc_2$ of equal dark resistance value as photoconductive cell $Rc_1$ and the traveling beam of light from a chopper arrangement as shown in FIG. 3 is allowed to sweep first one cell, then the other, and the spacing between cells being such that one cell is all dark when the other is all illuminated, and the light beam is rising on one when falling on the other, then the change in voltage across either cell of FIG. 2 will be double that of the conventional cell circuit, as shown in FIG. 1. However, the increase in the signal to noise ratio will only be a factor of $\sqrt{2}$.

Referring now to FIG. 3, there is shown illustrated the physical relationship that a light chopper must have in relation to cells $Rc_2$ and $Rc_1$ to accomplish the desired results. Reference numeral 17 represents a rotating mechanical chopper consisting of equally spaced radially extending vanes providing equal On and Off time of illumination from light source 18 at any single point in the cell area. D represents the distance between centers of the cells which are physically side by side, $d$ represents the distance between chopper vanes, R represents the distance between light source 18 and the plane of cells $Rc_1$ and $Rc_2$, and $r$ represents the distance between light source 18 and chopper 17. When R is made equal to $r \times D/d$ the physical condition discussed in the above paragraph is met. Under these conditions the R.M.S. signal measured across one of the photoconductive cells $Rc_1$ or $Rc_2$ is found to be twice as great as that measured across either cell when the second cell is replaced by a load resistor as in the conventional circuit shown in FIG. 1. The noise, however, will be found to be greater by only a factor equal to $\sqrt{2}$ for a signal-to-noise ratio gain of 3 decibels. Thus, as chopper 17 is rotated, and the physical relationship is such that the one photoconductive cell is all dark when the other is all illuminated and the light beam is rising on one when it is falling on the other, then the changes in resistance of the photoconductive cells are such that the responses from the two cells measured across one cell add coherently to produce twice the normal signal that the circuit of FIG. 1 would produce under similar circumstances while at the same time the cell noise add non-coherently to produce $\sqrt{2}$ times the noise normally produced in the one cell configuration as shown in FIG. 1. As shown in FIG. 3, the photoconductive cells are arranged side by side in the same plane. The circuit 10 is shown as a box in FIG. 3 with the photoconductive cells arranged therein. The particular structural configuration involved in arranging the photoconductive cells in the necessary relationship to each other form no part of this invention and will not be discussed in detail.

Besides the particular method of modulating the light with respect to the cells $Rc_1$ and $Rc_2$ discussed, other optical systems well known to the art may be utilized. For example, if it is desired to eliminate the beam sweeping or scanning the cells, a source of light may be made to rise and fall in intensity on each cell alternately holding to the requirement as stated above that the rise on one cell is simultaneous with the fall on the other and one is all dark when the other is all illuminated. This arrangement eliminates scanning noise as well as makes possible the placing of the photoconductive cells as close together as desired. Although the configuration as shown in FIGS. 2 and 3 may be used to measure simply light intensity, it is of such a nature as to have general utility, for example, as a D.C. to A.C. converter system per se.

The chief advantage of the present invention lies in the effective increase in sensitivity of the photoconductive cells as shown in the doubling of the R.M.S. output of the A.C. signal, while at the same time the gain in $S/N$ is only 3 db. which is an increase by only a $\sqrt{2}$ factor.

The present invention is not to be limited to any particular type of photoconductive cell but any photosensitive component that has a resistance which is variable with the intensity of light may be used.

Obviously, many modifications and variations of the present invention are possible in the light of the above teachings. It is therefore to be understood that within the scope of the appended claims the invention may be practiced otherwise than as specifically described.

What is claimed is:

1. A photoconductive cell circuit for use in a modulated light field comprising in combination: a first photoconductive cell, a battery connected electrically in series with said first photoconductive cell, a second photoconductive cell connected electrically in series with said first photoconductive cell and said battery and arranged physically in the same plane with said first photoconductive cell, means for sweeping a beam of light over said first and second photoconductive cells, chopping means between said light means and said cells having openings equal to the distance between said cells multiplied by the ratio of the light-to-chopping means distance to the light-to-cells distance, such that said beam rises on one of said photoconductive cells as it falls on the other of said photoconductive cells, and means for amplifying the voltage across one of said cells.

2. A photoconductive cell circuit for use in a modulated light field, comprising in combination: first photoconductive cell means, D.C. voltage source means connected electrically in series with said first photoconductive cell means, second photoconductive cell means connected electrically in series with said first photoconductive cell means and said D.C. voltage source means, light source means, chopping means between said light means and said cells having openings equal to the distance between said cells multiplied by the ratio of the light-to-chopping means distance to the light-to-cells distance, causing the light from said light source means to alternately rise and fall in intensity on each of said photoconductive cell means whereby an A.C. voltage is provided across each of said photoconductive cell means having a frequency proportional to the rate of the rise and fall in said intensity of said light and an amplitude proportional to said intensity of said light, and means for amplifying said A.C. voltage.

3. A photoconductive cell circuit for use in a modulated light field, comprising in combination: a first photoconductive cell, D.C. voltage source means connected electrically in series with said first photoconductive cell, a second photoconductive cell connected electrically in series with said first photoconductive cell and said D.C. voltage source means and arranged physically in the same plane and in side-by-side relationship with said first photoconductive cell, light source means, light chopper means interposed between said light source means and said first and second photoconductive cells for continuously sweeping individual beams of light over said first and second photoconductive cells, said chopper means having openings equal to the distance between said cells multiplied by the ratio of the light-to-chopper distance to the light-to-cells distance such that each of said beams rises on one of said photoconductive cells as it falls on the other of said photoconductive cell means, and means for measuring and amplifying the voltage across one of said cells.

References Cited by the Examiner

UNITED STATES PATENTS

| | | | |
|---|---|---|---|
| 2,227,147 | 12/1940 | Lindsay | 250—233 |
| 2,489,305 | 11/1949 | McLennan | 250—233 X |
| 2,576,758 | 11/1951 | Jones | 250—233 |
| 2,921,232 | 1/1960 | Machalek | 315—83.1 |
| 3,028,499 | 4/1962 | Farall | 250—209 |

RALPH G. NILSON, *Primary Examiner.*

MAYNARD R. WILBUR, CHESTER L. JUSTUS, *Examiners.*